Oct. 4, 1960
B. C. RAYNES
2,955,078
ELECTROLYTIC PROCESS
Filed Oct. 16, 1956
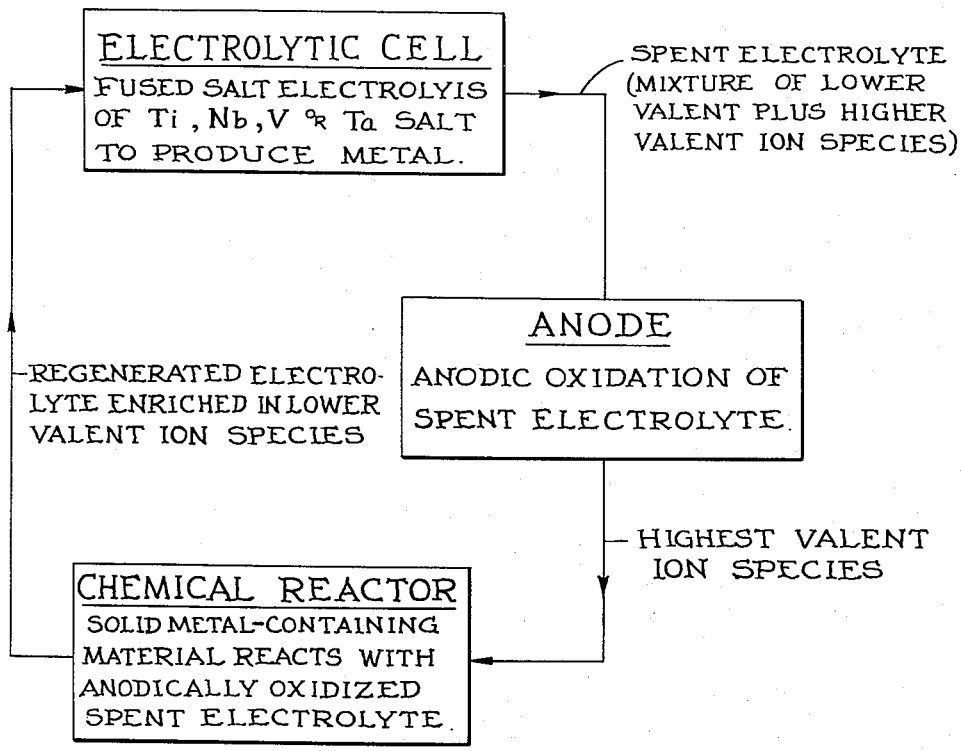
INVENTOR
BERTRAM C. RAYNES
BY Lawrence J. Field
ATTORNEY United States Patent Office 2,955,078
Patented Oct. 4, 1960

2,955,078

ELECTROLYTIC PROCESS

Bertram C. Raynes, Euclid, Ohio, assignor, by mesne assignments, to Horizons Titanium Corporation, Princeton, N.J., a corporation of New Jersey Filed Oct. 16, 1956, Ser. No. 616,118

6 Claims. (Cl. 204—64)

This invention relates to the production of transition metals such as titanium. More particularly, it relates to a fused salt electrolysis in which the metal is cathodically deposited and to an improved manner and means of carrying out said electrolysis.

In a copending application of John T. Burwell, Jr. and Quentin H. McKenna, Serial Number 398,193 filed December 14, 1953, which issued March 3, 1959 as United States Patent 2,876,180, there is described a method for producing cathode deposits of certain transition metals by electrolysis in fused salt baths wherein the source of the deposited metal is a fused salt electrolyte composition prepared by introducing a solid product composed of the carbide of the transition metal, or a mutual solid solution of the carbide and the monoxide of the transition metal or the transition metal itself in relatively impure form into a fused melt comprising at least one alkali metal halide or alkaline earth metal halide, or both, in further admixture with between 5 and 50% by weight of a halide of the transition metal. As further described, this melt may be the spent electrolyte of a previous electrolysis with consequent economy in the use of materials.

It has recently been observed that the system proposed in the earlier filed application suffers from one fundamental disadvantage which materially diminishes the efficiency of the operation when carried out in the cyclic manner contemplated. When "spent" electrolyte is withdrawn from the cell for reaction with a fresh supply of the solid material providing the transition metal, the reaction proceeds effectively between that portion of the spent electrolyte in which the transition metal is present in its highest valence state, e.g. +4 for titanium, but does not proceed to any appreciable extent between the transition-metal-providing-solid-material and the portion of the electrolyte in which the transition metal is present in its relatively lower valence states, e.g. +3 or +2 for titanium. It is evident, then, that it is necessary that the transition metal be present as an ion species in which it is in its highest valence form when it is brought into contact with the solid source material in order to efficiently convert the source of the transition metal, whether it be the carbide, mutual solid solution of carbide and monoxide or impure scrap metal, into the desired electrolyte from which the metal is later recovered as a cathode deposit.

From a study of the decomposition potentials in fused salt electrolytes, it seems probable that the transition metal ions present in the electrolyte comprise both higher valent ion species and lower valent ion species in proportions which vary. Hence when portions of the electrolyte are transferred from the cathode region to a region in which the transferred electrolyte is brought into contact with solid transition metal-providing material, it has been found that some lower valent ions inevitably accompany the desired higher valent transition metal ions.

It is a principal object of the invention to insure that the transition metal values in the recycled electrolyte be present in the highest valence form when recycled electrolyte is brought into contact with the solid transition metal-supplying material.

The method of the present invention is concerned with a cyclic process in which means are provided for insuring the presence of the transition metal ion species in the electrolyte is in the highest valent form when the electrolyte is brought into contact with the transition metal-supplying material. Furthermore, the method of this invention can be carried out in the electrolytic cell itself, if desired, thereby dispensing with the additional vessel required in the aforesaid Burwell, Jr. and McKenna application.

The method of the present invention is equally applicable to the production of any of the polyvalent transition metals which can be processed by the method of the aforementioned Burwell and McKenna application. That is, the present method is capable of producing any of the transition metals which, as impure metal, or as carbide, or as nitride, or as mutual solid solution of carbide and monoxide, or as carbide and/or monoxide and/or nitride dissolved in the metal, is capable of reacting with the higher valent ion species of the transition metal with consequent formation of the lower valent ion species of the transition metal. Titanium, niobium, tantalum and vanadium are presently known to participate in the stated reactions in the desired manner. In the case of zirconium and hafnium, there are presently indications that as chlorides these transition metals may exist in several valence states and hence it is entirely possible that these metals may be prepared by the presently proposed method.

In the drawings, the figure schematically depicts a suitable form of apparatus which may be utilized in the practice of this invention.

In accordance with the present invention, the fused electrolyte, hereinafter referred to as "spent" electrolyte, is withdrawn from the vicinity of the cathode for regeneration of the lower valent ion species whereby it will be rendered amenable to a repetition of the electrolysis. During regeneration of the electrolyte, the lower valent ions in the fused salt become reoxidized to the desired higher valence by contact with an anode provided for the purpose. To insure that substantially all of the transition metal ions ultimately present are in this higher valence state, in one embodiment of this invention, shown in the drawings an anodic means is provided between the cell and a reactor. One such anodic means, for example, is a packed anodic tube containing fragments of graphite through which the electrolyte salts are pumped or recycled en route to the reactor in which the higher valent ion species is to be reacted with the solid refractory metal-containing source material. Another suitable means for assuring the complete reoxidation of the polyvalent metal ions in the withdrawn electrolyte, is a perforated barrier or porous anode through which the spent electrolyte is forced to pass prior to entry into the reactor, thus effecting excellent contact between anode and electrolyte over a large surface area of anode with consequent completion of the conversion to the higher valent species of the transition metal ion in the electrolyte after it has been so processed.

Inasmuch as the production of titanium is representative of the production of the other aforementioned transition metals, the following description will be directed simply to the titanium aspect of the invention in the interest of simplicity. However, it must be understood that what is said with respect to the production of titanium applies with equal force and effect to the production of each of the other transition metals and particularly niobium, tantalum and vanadium.

The fused electrolyte from which a cathode deposit of titanium is formed pursuant to this invention may comprise one or more of the alkali metal halides, such as sodium and potassium chlorides, bromides, iodides and fluorides, or one or more of the alkaline earth metal halides such as calcium, barium, strontium and magnesium chlorides, bromides, iodides and fluorides or mixtures of one or more of each of these alkali metal halides and alkaline earth metal halides in further combination with a titanium halide, or with a lower valent titanium ion species whether or not it is considered as being derived from a halide.

The components of the electrolyte should be of high purity and should be substantially completely anhydrous in order to minimize the introduction of extraneous impurities, including oxygen, into the deposit of titanium produced by the electrolysis of the fused salt bath. The alkali metal halides and alkaline earth metal halides are commercially available in a state of purity adequate for use in the practice of the present invention. It is particularly desirable to have a resulting bath which is stable at temperatures up to 1200° C., and which has a relatively low melting point well below 800° C., and from which very little in the way of volatile fumes are lost within the temperature range between the melting point and 1200° C.

Fusion of the components of the electrolyte is carried out under conditions which will assure the absence of atmospheric oxygen and moisture. Thus, it has been found advantageous to carry out this fusion in a separate vessel in which an inert atmosphere of argon or other noble gas may be maintained. The salt in the melting vessel may be heated by any means which will not introduce impurities thereinto. For example, the heat may be supplied by electrical or burning means positioned outside the vessel. Alternatively, the salt may be heated by electric resistance elements within the melting vessel itself. The salts should be heated to a temperature at least 50° C., and advantageously about 100° C., above the fusion point in order to insure adequate reactivity of the ions in the fused mass. In general, the requisite bath reactivity is insured by heating to temperatures of at least about 850° C., or above. Temperatures of from about 850 to 1300° C., and preferably within the range of 900 to 1200° C. are effective in promoting the reaction between the solid titaniferous material and the higher valent titanium ion species present in the system, higher temperatures within this range promoting more rapid and more efficient reaction.

The introduction of the titanium component of the solid titaniferous material into the electrolyte is assured by simply immersing the solid titaniferous material in the bath and preferably in the preferred embodiment in the vicinity of the anode. The solid titaniferous materials useful for this purpose are those in which the titanium is present as an interstitial rather than a substitutional element. These titaniferous materials include titanium carbide, titanium nitride, a mutual solid solution of titanium carbide and titanium monoxide, and metallic titanium in relatively impure form, e.g. metallic titanium containing titanium carbide and/or titanium monoxide and/or titanium nitride dissolved therein. The metallic titanium may be, for example, the product of a pyrometallurgical reduction process, such as the Kroll process, as described in Patent 2,205,854, or it may be titanium alloy scrap or metallic titanium in the form of powder or pieces produced incidentally with the manufacturing and fabrication of titanium articles from sheet, bar, or powder materials. In each of these titaniferous materials, the titanium appears to exist as the elemental metal and in this form it reacts with the higher valent titanium ion species to produce a lower valent ion species which is capable of electrolytic deposition on the cathode.

The solid titaniferous material may be introduced into the electrolytic cell either in the form of relatively large lumps or in the form of smaller pieces of about 1/4 inch in the maximum dimensions, or even in the form of finely divided particles. When it is to be put directly into the cell, then it may be confined to a region adjacent to the anode by a graphite basket or by means of perforated baffles, or by any other suitable means. It is, of course, often advantageous to make the confining means, if suitably designed, anodic so that regeneration of the electrolyte for reaction with the solid metal supplying material prior to contact between the unregenerated electrolyte and the solid titaniferous material is further assured.

Extraction of the titanium component of the solid titaniferous material, and its resulting dissolution in the fused salt bath, is effected by reaction between the titanium halide component of the bath and the titanium component of the aforementioned type of solid titaniferous material. In this reaction the metalliferous titanium component of the solid material is oxidized to a titanium compound and the titanium halide component of the bath is correspondingly reduced to a lower valence titanium halide. For this reason, then, the practice of the invention is restricted to the refractory metals capable of existing in at least two different valence states in the form of halide salts, and this requirement is satisfied by titanium, niobium (columbium), tantalum and vanadium, and is probably satisfied by other metals of groups IV-A and V-A of the periodic table. With each of these elements, its halide which is incorporated in the fused salt is the higher or highest valence form, and the final bath composition contains the transition element in the form of one of its lower valence halides. It will be readily understood, therefore, that the amount of the transition metal which is extracted from the solid transition metal material is a function of the amount of the transition metal higher valence halide which is incorporated in the initial salt mixture and the difference in valence of the transition metal in the two forms of its halide which predominate in the bath before and after the aforementioned reaction. In the case of titanium each mol of alkali fluotitanate (in which the titanium has a valence of four) will extract one-third mol of titanium from the solid titaniferous material.

The resulting fused salt bath containing the extracted titanium component of the solid titaniferous material is capable of being electrolyzed in the fused state with the resulting electrodeposition of the extracted titanium component in the form of titanium metal. In transferring the fused salt bath to an electrolytic cell, unless the bath is formed in situ in the cell, it may be advantageous to filter the bath to remove any residual solid such as carbon or unreacted titaniferous material. The transfer of the fused salt may be carried out through pipes of graphite or other inert material communicating between the thermal reactor and the electrolytic cell.

The electrolytic cell equipment and the electrolytic conditions, such as cell voltage and cathode density, are well known in this art and need not be further described. Reference may be had to United States Patent 2,731,402, which describes the electrolysis of a fused salt titanium halide-containing bath for suitable operating conditions. As described therein, the product of the electrolysis is titanium metal, which is deposited on the cell cathode as a recoverable titanium deposit. The resulting spent cell bath, after completion of this electrolytic decomposition of the extracted titanium component of the bath, is caused to circulate into intimate contact with an anodic member provided to reoxidize the lower valent species of titanium ion present to its tetravalent state so that it may then be returned directly to the fused salt-solid material reactor for a completely cyclic operation. If desired, however, the production of the titanium-containing bath and its subsequent electrolysis may take place successively and repeatedly in a single vessel which thus serves both as the reactor and as the electrolytic cell.

When, as shown in the drawings, separate vessels are provided for effecting the reaction and the electrolysis, the reactor comprises a graphite vessel preferably, although other materials of construction may be used. As indicated above, the vessel should be provided with means for maintaining any desired inert atmosphere above the contents of the vessel and with means for maintaining the contents at any desired elevated temperature. Such means should be capable of maintaining the contents molten at the preferred reaction temperatures of between 900 and 1200° C. Reconstituted electrolyte may be discharged from the vessel through a separating means, such as a filter of graphite, to insure that impurities and any unreacted solid titaniferous material are not carried into the electrolytic cell. The reconstituted electrolyte in which the titanium is now present in the form of the lower ion species and particularly in the form of trivalent titanium, is now returned to the cell for a repetition or continuation of the electrolysis. Preferably, it is introduced into the cell in the vicinity of the cathode upon which the ion is to be electrodeposited.

The practice of the invention is illustrated by the following specific examples.

In order to illustrate the effect of repetitively reacting a suitable source of titanium, for example titanium carbide (TiC), with a fused melt of sodium chloride (NaCl) and potassium fluotitanate ($K_2TiF_6$) and then electrolyzing the reaction product and then regenerating the spent electrolyte by further reaction with titanium carbide, the following series of experiments were performed.

A graphite crucible was placed in a laboratory inert atmosphere furnace and charged with 630 parts by weight of titanium carbide in the form of rods, 276 parts by weight of recrystallized potassium fluotitanate ($K_2TiF_6$) and 1400 parts by weight of sodium chloride (NaCl). Before reaction the titanium content of the water soluble portion of the charge was 3.2%. The charge was held at a temperature of 850° C. for five hours to permit complete reaction to take place between the TiC and molten $K_2TiF_6$. The resulting salt cake thermal reaction product was permitted to cool and then was removed from the cell. The titanium carbide and solid carbon were separated from the salt. The salt had a deep red-brownish color. The salt was analyzed and found to contain approximately 5.3% water soluble Ti. This indicated that a considerable amount of the TiC and $K_2TiF_6$ had reacted to form the lower valent species further evidenced by the red-brown color of the salt. The salt cake was crushed and recharged into an electrolytic cell equipped with means to control the atmosphere therein. The salt was melted and then maintained at about 850° C. by application of heat. Electrolysis was carried out at between 1.5 and 2.3 volts, cell voltage. No evolution of free halogen was observed. A cathode deposit containing 8 parts by weight of titanium metal of a commercial quality was obtained. The salt bath turned deep lavender as a result of the electrolysis. The molten bath was permitted to cool and solidify and was then analyzed again for titanium. The salt analyzed approximately 3.2% Ti. After removal of the unreacted titanium carbide, the spent electrolyte was charged into a clean graphite crucible similar to that in which the first thermal reaction was effected. Titanium carbide rods were added thereto in the proportion of 140 parts by weight of titanium carbide to 1188 parts by weight of the lavender-colored spent electrolyte. The mixture was then maintained at a temperature of 850° C. for about five hours, resulting in a deep red salt product analyzing approximately 3.7% water soluble Ti. A steel cathode was inserted into the regenerated electrolyte and electrolysis was conducted at bath temperatures between 843 and 850° C. with a cell voltage of between 2.05 and 2.7 volts. A cathode deposit containing 6.5 parts by weight of titanium metal of commercial quality was obtained. Only a slight reaction could be achieved when it was attempted to regenerate the spent electrolyte by further reaction with TiC and the salt remained lavender when in contact with TiC for about four hours at above 850° C. The product analysis indicated that only a slight reaction occurred.

This series of runs illustrated that the regeneration was not fully effective in reconstituting the electrolyte. It appeared that this might be due to the presence of large amounts of titanium in the form of an ion species not readily susceptible to reaction with the titanium carbide.

Another series of runs was made in which titanium carbide served as the anode and the electrolysis and thermal reaction were carried out simultaneously, as disclosed in other copending applications, namely Serial No. 320,345 filed by Eugene Wainer on November 13, 1952 and Serial No. 358,194 filed by John T. Burwell, Jr. and Merle E. Sibert on May 28, 1953. In these experiments it was found that while the process could be continued more or less indefinitely, that is, if titanium carbide was added to the cell, titanium could be obtained as a cathode deposit as long as titanium carbide was available at the cathode; nevertheless, the process again exhibited a decreasing efficiency of operation. When, however, fresh tetravalent titanium ion was made available to the electrolyte, the efficiency of the process increased until it approached the original efficiency. In this case, then, tetravalent titanium ion was found to be essential to the process efficiency as before and was made available from sources outside of the electrolytic cell.

A third series of runs was made, employing the principle disclosed in the instant application. In these runs a single vessel served as both reaction chamber for the thermal reaction and cell for the electrolysis. The vessel actually employed was a crucible provided with an anodic barrier formed from a graphite member which had been perforated with a multiplicity of fine holes to permit the electrolyte to circulate freely between the two portions of the vessel but which prevented the zero valent titanium source material from circulating from the one region in which it was confined into the other region of the vessel. The barrier was connected to the positive terminal of a battery and the circuit was completed by a connection from the negative terminal of the battery to a cathode suspended in the region of the cell not containing the titanium supplying material. Of course, the electrolyte itself completed the circuit between cathode and anode. By maintaining the barrier anodic and by insuring that the titanium-containing material being refined was in electrical contact with the anodic barrier, it was found that the circulation of the electrolyte through the multiplicity of fine holes continually regenerated the necessary +4 ion species essential to a continuity of operation at high efficiencies, both process efficiency and current efficiency. Specifically, over a period of 388 hours a charge of impure titanium scrap was electrolyzed at the current density of between 145 and 450 amperes per square decimeter of cathode surface and a cell voltage of about between 2.2 volts and 7.1 volts in a fused electrolyte comprising 16% by weight of $K_2TiF_6$ and 84% by weight of NaCl maintained under an inert atmosphere of argon. The electrolyte was heated to a temperature between 750° C. and 900° C. throughout the electrolysis. Under these conditions no chlorine or other free halogen was evolved at the anode and a soft ductile titanium deposit was obtained at the cathode. Ninety-four cathodes were removed from the cell as a result of an input of 160,360 ampere hours of current. The titanium content of the water soluble portion of the electrolyte was 3.2% at the beginning of the run and was checked throughout the run and found to vary between 3.09% and 3.79%. The current efficiency for the first cathode deposit based on a conversion $Ti^{+3} \rightarrow Ti^0$ was 96% while at the end of the run it was 93%. Thus it will be seen that the efficiency of operation was maintained at substantially the original level. It should be noted that in the run described, small amounts of make-up salt (NaCl and $K_2TiF_6$) were added from time to time to the bath to replenish the salts lost mechanically or removed with the cathode deposit. Since the current efficiency did not appreciably change during the runs in which no salt addition was made, it was concluded that the high current efficiency was not the result of these intermittent salt additions but rather was characteristic of the process carried out in the manner described in which the electrolyte is regenerated by intimate forced contact with an anode so that the dissolved titanium carrier ions were re-converted to a +4 valence for a repetition of the thermal portion of the process in which the tetravalent titanium was converted to an ion species readily electrodeposited, i.e., either trivalent or possibly divalent titanium.

It will be appreciated, accordingly, that the method of my invention makes possible a highly efficient recovery of the aforementioned transition elements by a combination of chemical reaction and electrolysis. This combination is particularly amenable to commercial scale operation because the reaction and electrolysis may be carried out simultaneously in separate and independently controlled reaction zones. My method is also characterized by the fact that the fused salt or salt mixtures used in practicing the invention may be recycled between the thermal reaction and electrolysis operations. Therefore, the only consumable reactant is the solid titaniferous material. Any solid titaniferous material remaining unconsumed at the end of each extraction period, may be readily separated from the salt bath in the reaction zone and recovered for reuse. Such recovery is advantageously effected by mechanically agitating the unused solid titaniferous material, together with any residual carbon particles, e.g. from titanium carbide, when this material furnishes the titanium to the system, in order to separate from the useful titaniferous component any residual non-usable material such as carbon. The solid titaniferous component of this mechanically agitated mixture may then be separated by any conventional means so that it may be returned to the thermal reaction stage. Thus, except for relatively small make-up quantities of the salt component of the fused bath to compensate for mechanical losses, the only consumable raw material comprises the solid titaniferous material which is used as one of the reaction components. This economy of raw materials, coupled with the continuity of operation at continuing high efficiencies, and the high degree of purity of its primary product (the transition metal such as titanium), characterizes my method as one pre-eminently suitable for commercial scale operation.

To further illustrate my invention, a fourth series of electrolyses was performed in which the source of titanium was contaminated metallic titanium scrap having an average Brinell hardness of over 350 and containing 5.22% oxygen by weight and 3.53% nitrogen by weight and 0.452% carbon by weight. As in the previous runs, the electrolyte consisted of between 84% and 90% by weight NaCl and between 16% and 10% by weight of $K_2TiF_6$. The anode current density varied between 7 and 58 amperes per square decimeter and the cathode current density varied between 75 and 520 amperes per square decimeter, based on the original cathode area. The over-all cell voltage, that is, the IR drop between anode and cathode, was between 0.5 and 5 volts and was usually maintained between 3.5 and 5 volts. With bath temperatures between 850 and 965° C., a series of electrolyses were made in which the scrap was charged into the cell adjacent the anode and behind a perforated graphite member. The electrolyte passing into contact with the impure metal to be refined, thus necessarily passed through the perforations of the anodic graphite member which insured that a supply of tetravalent titanium ions would be provided for reaction with the impure metal charge. The process was shown to be capable of operation for an indefinite period, on impure metal containing 90–95% titanium and of yielding as product, refined titanium metal at current efficiencies of up to 97%. The product contained less than 0.10% total of oxygen, nitrogen and carbon and was the equivalent of virgin metal.

Having now described my invention in accordance with the patent statutes, I claim:

1. In the method of producing a polyvalent metal of the group consisting of titanium, niobium, vanadium and tantalum which includes: (1) electrolyzing a fused salt bath containing said metal in the form of a lower valent ion species, thereby depositing said metal at a cathode in said bath by reducing lower-valent ion species at the cathode and concurrently therewith, oxidizing another portion of said lower-valent ion species at an anode, and thereby producing a spent electrolyte containing a mixture of lower-valent ion species and higher-valent ion species of said metal; (2) transferring a portion of spent electrolyte from the electrolytic cell to a vessel in which it physically contacts solid material containing the metal to be electrolytically deposited and regenerating the so-transferred electrolyte by permitting it to chemically react with said solid metal-containing material selected from the group consisting of the carbide of said metal, the nitride of said metal, a mutual solid solution of the carbide and the monoxide of said metal and the said metal in impure form; and (3) returning the regenerated electrolyte to the electrolytic operation; the improvement in said process which consists in continuously withdrawing spent electrolyte from said fused salt bath; bringing the withdrawn spent electrolyte into physical and electrical contact with an electrically energized anode whereby the lower-valent ion species of said metal present in the withdrawn spent electrolyte is oxidized to the highest-valent ion species of said metal; thereby maintaining a high efficiency in the subsequent chemical reaction between said fused salt and said solid metal-containing material; transferring said anodically oxidized electrolyte to a zone wherein it physically contacts said solid metal-containing material and continuously returning the resultant regenerated electrolyte, enriched in lower-valent ion species of said metal, to the fused salt bath for electrolysis.

2. The method of claim 1 wherein the fused salt bath consists essentially of at least one alkali metal halide and at least one alkali metal double fluoride of said metal.

3. The method of claim 1 wherein the metal is titanium.
4. The method of claim 1 wherein the metal is niobium.
5. The method of claim 1 wherein the solid is impure metal.
6. The method of claim 1 wherein the solid is the carbide of the metal.

References Cited in the file of this patent
UNITED STATES PATENTS

| | | |
|---|---|---|
| 473,118 | Heroult | Apr. 19, 1892 |
| 518,732 | Choate | Apr. 24, 1894 |
| 700,563 | Sadtler | May 20, 1902 |
| 1,467,202 | Slatineanu | Sept. 4, 1923 |
| 1,588,679 | Hale et al. | June 15, 1926 |
| 2,182,567 | Mantell | Dec. 5, 1939 |
| 2,273,798 | Heise et al. | Feb. 17, 1942 |
| 2,667,413 | Jordon | Jan. 26, 1954 |
| 2,706,153 | Glasser | Apr. 12, 1955 |
| 2,707,170 | Wainer | Apr. 26, 1955 |
| 2,712,523 | Alpert et al. | July 5, 1955 |
| 2,731,404 | Wainer | Jan. 17, 1956 |
| 2,734,856 | Schultz et al. | Feb. 14, 1956 |
| 2,741,588 | Alpert et al. | Apr. 10, 1956 |
| 2,748,073 | Mellgrew | May 29, 1956 |
| 2,783,142 | Singleton et al. | Feb. 26, 1957 |
| 2,876,180 | Burwell et al. | Mar. 3, 1959 |